United States Patent [19]

Spence-Bate

[11] 4,068,941

[45] Jan. 17, 1978

[54] MICROFICHE RECORDS

[76] Inventor: Harry Arthur Hele Spence-Bate, 1 Cheam Place, Morley, Australia, 6062

[21] Appl. No.: 723,599

[22] Filed: Sept. 14, 1976

[30] Foreign Application Priority Data

Sept. 18, 1975 Australia ............................... 3241/75

[51] Int. Cl.² ............................................ G03G 15/00
[52] U.S. Cl. ......................................... 355/5; 354/76; 364/200
[58] Field of Search ............... 354/75, 76, 77; 355/20, 355/40, 43, 5, 3; 364/200, 900

[56] References Cited

U.S. PATENT DOCUMENTS

| | | | |
|---|---|---|---|
| 3,693,520 | 9/1972 | Goldman et al. | 354/76 |
| 3,722,995 | 3/1973 | Dahlquist | 355/20 X |
| 3,759,611 | 9/1973 | O'Connell et al. | 355/43 |
| 3,820,890 | 6/1974 | Kuehnle | 355/5 |
| 3,951,543 | 4/1976 | Mulligan | 355/5 X |

Primary Examiner—William M. Shoop
Attorney, Agent, or Firm—Fidelman, Wolffe & Waldron

[57] ABSTRACT

Apparatus for handling information which includes the facility of receiving the information either on a microform film, a conventional document platen or from a computer input; the information is then recorded by a camera onto a microform film, preferably a microfiche, and the recorded microform is then passed to an electronic scanner and displayed via a store on a first display, meanwhile the recorded film is preferably stored in a photographic store; the information on the first display, which is preferably in a slave unit whereas the camera and scanner are preferably in a terminal unit, is then checked by an operator and a reply is generated at a keyboard preferably in the slave unit, which reply is displayed on a second display and is fed back to the camera for recording on microform film and transmitted either in the form of a computer output or as a microform film which is preferably a microfiche; the transmitted microform film may be the same microform film received in the first place updated with the reply generated by the keyboard; and authentication device may be provided to authenticate the reply in the manner of a signature.

17 Claims, 1 Drawing Figure

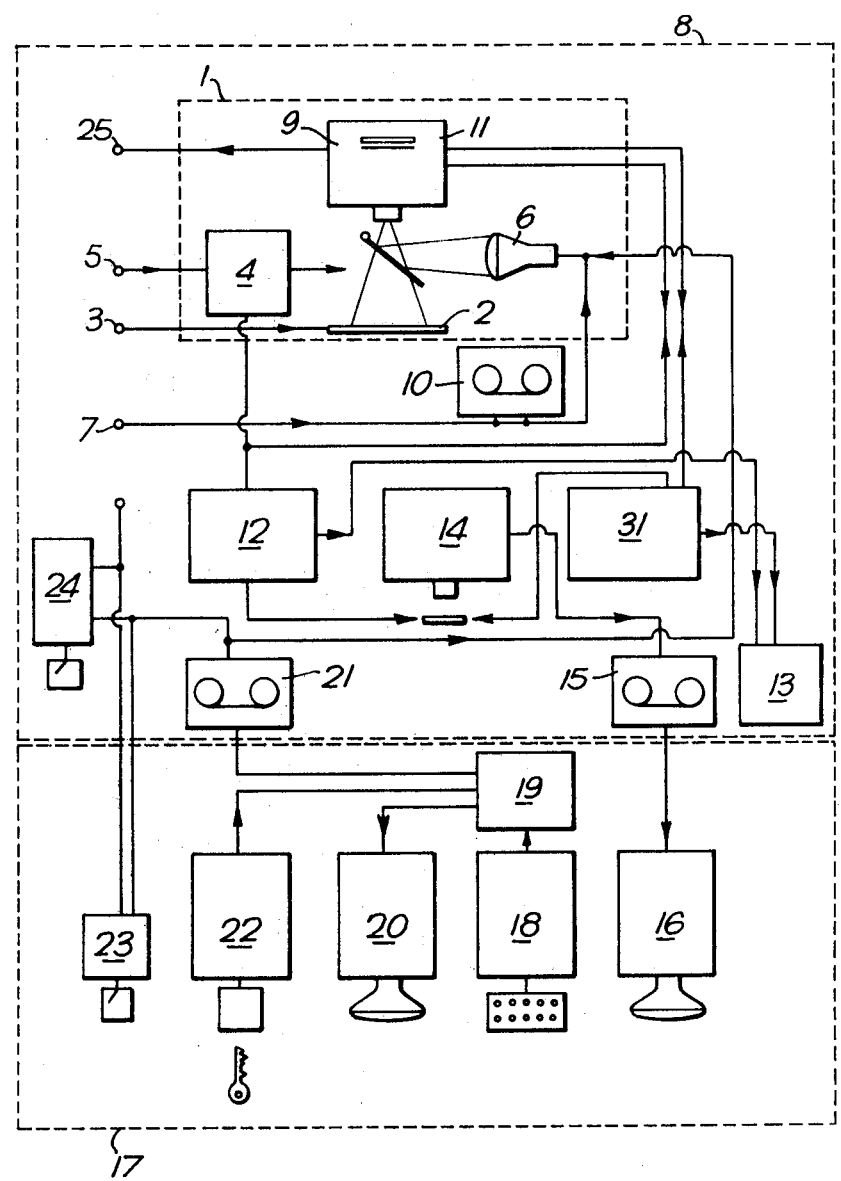

MICROFICHE RECORDS

The present invention relates to information handling apparatus.

Due to the large amount of information handled in large organizations the clerical work and paper generated becomes costly and difficult to handle. Attempts to reduce the number of individual pieces of paper, size of files and total volume of paper have been made by reducing the individual pieces of paper to microform images stored on microfiche and microfilm. Other attempts at overcoming the problem have been to reduce the information contained on the paper to computer stored tape. The advantage of microform storage is the ease of reading the information and the fact that the information may be recorded precisely as received. The disadvantage of microform information storage is that it is often slow to extract individual images on microform and transmitting the information may be only as fast as the conventional full sized images which will hereafter be called 'CON' images. Computer information can be readily transmitted and displayed by means of cathode ray tubes but has the disadvantage that the actual image, hereafter called a 'COM' image, cannot be reproduced in precisely the same form as received. Furthermore, COM images may be subject to alteration or errors which cannot readily be checked.

The present invention has as its aim the combination of microform and computer storage using the best advantages of each system with the aim of further reducing the necessity for clerical staff.

Apparatus according to the present invention comprises a microform camera including a document copying platen, a microform film holder, and a cathode ray tube, means for recording an image from either the copying platen, film holder or tube onto a further microform film held on a moveable carriage in the camera, means for moving the further film to an image recording position so that images can be recorded in different frames on the film, an electronic scanner for scanning each recorded image, a first store arranged to store the electronic scanned image, a first display for displaying the image stored in the first store, a keyboard generating characters, a second store storing the generated characters and a second display for displaying the generated characters, the second store feeding said cathode ray tube.

An advantage of the apparatus according to the invention is that an image or communication can be fed into the apparatus either in the form of a computer input to the camera cathode ray tube where it is converted into a photographic image which can be stored on microfiche or microfilm. The camera and photographic store can be in a terminal unit. At the same time the image can be displayed on the first display in a slave unit or other first displays in other slave units. Thus an original copy of the information is kept securely in the terminal unit. Meanwhile if a reply to the communication is required the slave unit operator, who is provided with the keyboard, can generate a reply which is temporarily stored in the second or reply store and checked on the second display. The reply thus generated is then fed to the camera cathode ray tube in the terminal and again photographically recorded. This reply record is preferably recorded on the same photographic record as the communication so that replies and communications are stored on a single photographic record in the manner of a file. The reply can be transmitted from the terminal to an outside source either as a direct on line computer communication or else as a microfiche or microfilm copy of the photographically stored record. Preferably microfiche is used since this is simpler to handle than microfilm and can be sent by letter post.

If required paper copies can be made of replies or communications by means of a xerographic copier a number of which are commonly known. If correspondence with the terminal is required to be entirely on paper (con images) this can be achieved by feeding communications to the camera copying platen and by producing xerographic copies of the stored microform images. But clearly the bulk of postage is reduced by using microfiche and communication is quicker by sending COM images.

In order to authenticate replies from the terminal, the slave unit may be provided with a signature device which preferably is operated by an individual key possessed by a signatory, the key when inserted in the device generates a special character or group of characters in a character generator linked to the keyboard which is then fed to the second or reply store. If written conventional signatures are required to be transmitted with the reply, these can be prewritten into a signature store to which the signature device has access and reproduced photographically on the reply microform.

If necessary the terminal can have a second photographic store which stores the microforms received in a communication to the terminal and replies can be recorded by the means for recording an image from the film holder on the same microform or microforms received in the communication. Thus a reply and communication microform, preferably a microfiche, can be sent to and from a communicator with the terminal. This microform would build up a complete history of replies and communications whilst the terminal would retain a true photographic copy of the reply and communication microform. The advantage of this arrangement is that tamperproof easily accessible records would be developed having all the advantages of original manuscript or typescript paper records but with a much quicker and better access and ease in transmission. The staff required to operate such an apparatus would merely be a terminal operator and a slave operator, who could be a secretary.

The invention will now be described with reference to the accompanying diagram which is a block diagram of an information handling apparatus according to the invention.

The camera which is included within the broken line 1 is preferably of the form shown in detail in patent application No. 13933/76, but may be a combination of the camera shown in U.S. Pat. No. 3,826,571 (Australian patent application No. 54291/73) with the editor shown in Australian patent application No. 72149/74 or other editors shown in my subsequent patent applications. Basically the camera comprises a document copying platen 2 for copying CON images from an incoming communication such as a letter, diagrammatically shown an CON input 3, an editor 4 which can accept a microfiche or microfilm communication input 5 and a cathode ray tube 6 which can accept a communication from a computer at a COM input 7. The camera is part of a terminal unit shown by broken lines 8. The terminal operator can select which input he requires as is indicated by various switching means described in my previous patent specifications.

Once the communication has been received, the information is recorded on a microfiche 9 within the camera. In the case of a CON image this is recorded direct from the platen 2, in the case of a microform image, either microfiche or microfilm. This is recorded by inserting the microform into the editor and either manually or mechanically depending on which of my previous described editors is preferred, and in the case of a COM image the communication is fed either directly to the tube 6 or via a temporary store 10 which can store the communication until it is ready to be recorded on the microfiche 9 in the camera head 11. The store 10 is suitably a tape store with either magnetic or photosensitive recording. Such a store is commonly available and need not be described in detail.

After recording the communication on the microfiche 9 this fiche is passed by a transport mechanism to a first photographic store called an R store 31 where all originals of communications and replies are retained. Microfiches in the R store are known as R fiches. In the case of receiving a CON input a further copy of fiche 9 is made by the camera which is passed to a second photographic store called a Q store 12. In the case of receiving a microform input this is converted if necessary to the microfiche standard of the apparatus and passed to the Q store or else if no conversion is required the microform is passed without a further copy being required direct to the Q store and this microform will be known as a Q fiche.

During the recording process it may be necessary for the terminal operator to add a reference to the R fiche or Q fiche, for subsequent retrieval. Titling can also be applied as described in my previous patent specifications.

It should be added at this stage that the fiches are preferably developed by a Diazo process.

Once the Q and R fiches are stored the process of reading and dealing with the communication can begin. Also at this stage xerographic copies can be taken by transferring the Q and R fiches by a suitable transfer mechanism to a copier 13. The copier may be one of several commonly available.

To begin the process of reading and dealing with the communication, the R fiche is transferred to an electronic flying spot scanner 14 which scans the image of the communication received. This scanned image is then stored in a temporary first or retrieval store 15 similar in function and design to store 10. The image is then transferred to a retrieval display 16 in a slave terminal 17. The slave operator then examines the communication and decides on the required reply. The reply is then recorded by means of a keyboard 18 in the slave terminal. The keyboard 18 having access to a character generator 19 simultaneously passes the reply to a second or output display 20 in the slave terminal and a second or reply store 21 which is preferably in the terminal 8. The reply store 21 is again of a similar type to stores 15 and 10.

In order to authenticate the reply a signature device 22 is provided at the slave terminal. This device is operated by an individual key held by the authenticator. On insertion of the key, the individual shape of the key actuates signal generators the combination of which actuate character generator 19 to form an individual character or group of characters representing a signature with, if necessary, the name of the signatory also generated. This signature is then passed to the reply store 21 to be added to the reply. The signature is preferably applied after the reply has been checked by reference to the output display 20, and the operation of the signature key also acts as a reply transmission order to the reply store.

The reply is now transmitted from the slave unit to the terminal tube 6 where the reply is recorded photographically on the R fiche previously dispatched from the R store. If a reply is to be transmitted from the terminal in the form of a microfiche, the Q fiche is retrieved from the Q store and the reply added to the Q fiche which is then sent out from the terminal at output 25. If a reply is to be sent by paper the Q fiche is retrieved, the reply recorded on the Q fiche, transferred to the copier 13 and sent out as a xerographic copy. If a reply is to be sent by computer then a CON/COM select switch 23 or 24 is operated by the slave or terminal operator and transmitted via computer output 26.

It will be appreciated that by the combination of electronic stores and photographic stores great flexibility is achieved whereby the immense capacity of photographic stores which if necessary can be unloaded manually is utilized to prevent overloading of storage while the electronic stores can provide immediate access. Thus the apparatus avoids the disadvantage of overloaded conventional computer stores where the user has to wait for access.

Furthermore, terminals can be interlinked to provide rapid access and information handling while several slaves can be provided for each terminal.

It should be added that the form of microfiche generated in the apparatus can be as disclosed in my patent application No. 69933/74 in which only part of a fiche is actually produced so that the R fiche can have the whole file history while the Q fiche can have part of the history edited for communication purposes.

Such an apparatus is also suitable for bank use and can be used for storing cheques and issuing statements of account.

We claim:

1. Apparatus for handling information comprising a microform camera including a document copying platen, a microform film holder, and a cathode ray tube, means for recording an image from either the copying platen, film holder or tube onto a further microform film held on a moveable carriage in the camera, means for moving the further film to an image recording position so that images can be recorded in different frames on the film, and electronic scanner for scanning each recorded image, a first store arranged to store the electronic scanned image, a first display for displaying the image stored in the first store, a keyboard generating characters, a second store storing the generated characters and a second display for displaying the generated characters, the second store feeding said cathode ray tube.

2. Apparatus as claimed in claim 1 wherein the microform camera includes a photographic store for storing the further microform.

3. Apparatus as claimed in claim 1 wherein the further microform is a microfiche.

4. Apparatus as claimed in claim 1 wherein the cathode ray tube is provided with an input for receiving computer information.

5. Apparatus as claimed in claim 1 wherein the camera is included in a terminal unit and the display and keyboard are included in a slave unit.

6. Apparatus as claimed in claim 5 wherein further slave units are provided.

7. Apparatus as claimed in claim 1 wherein an electrostatic copying means is provided to which the further microform film is arranged to be fed for reproduction of an image from the further microform film.

8. Apparatus as claimed in claim 1 wherein a signature device is provided for authenticating a reply generated by the keyboard, which device is arranged to feed the second store.

9. Apparatus as claimed in claim 8 wherein the signature device is arranged to be operated by differently shaped keys, the shape of the key causing a signature character or characters to be generated depending on the particular shape of the key.

10. Apparatus as claimed in claim 2 wherein a second photographic store is provided for storing microform film received by the film holder.

11. Apparatus as claimed in claim 10 wherein means are provided for feeding microform film from the second photographic store to the camera film holder or the moveable carriage in the camera for recording a reply generated by the keyboard.

12. Apparatus as claimed in claim 1 wherein means are provided for feeding microform film from the first photographic store to the moveable carriage in the camera for recording a reply generated by the keyboard.

13. Apparatus as claimed in claim 1 wherein a reply generated on the keyboard is arranged to be recorded on the cathode ray tube.

14. Apparatus as claimed in claim 13 wherein the reply is arranged to be fed to a tube for transmission to an information receiving means.

15. Apparatus as claimed in claim 4 wherein a third store is linked to the said computer input for storing information before or after receipt by the cathode ray tube.

16. A method of handling information comprising receiving the information on a document copying platen, a microform film holder or a cathode ray tube, recording the received information on a microform film, scanning electronically the recorded microform film and displaying the scanned information on a first display, generating a reply on a keyboard, displaying the reply on a second display, feeding the reply to the cathode ray tube, recording the reply displayed on the cathode ray tube on a microform and transmitting the reply.

17. A method as claimed in claim 16 wherein the reply is authenticated by a character or characters representing a signature.

* * * * *